No. 784,450. PATENTED MAR. 7, 1905.
W. H. UHLAND.
APPARATUS FOR MAKING STARCH.
APPLICATION FILED SEPT. 9, 1903.

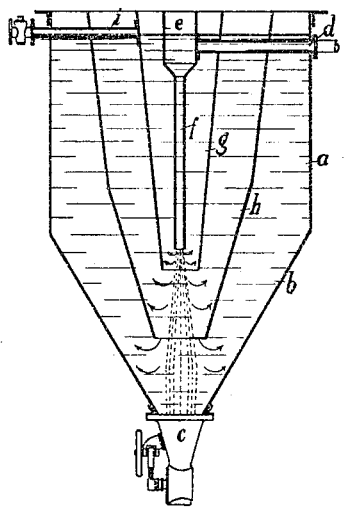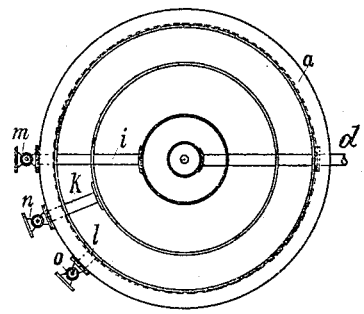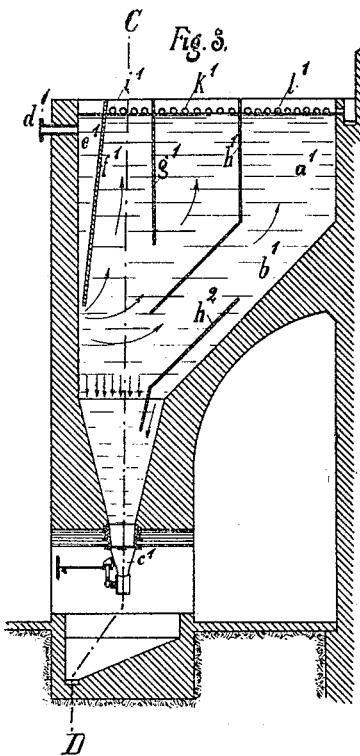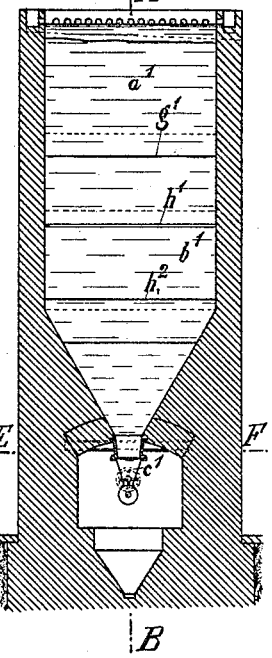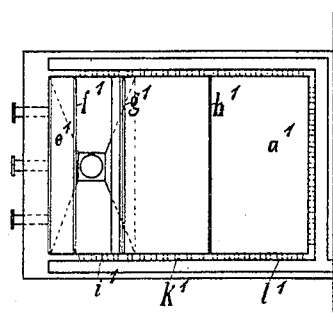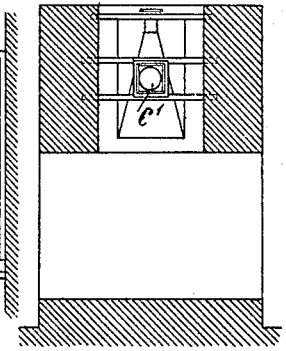

2 SHEETS—SHEET 2.

Witnesses:
Max Mayer.
Arthur Walther.

Inventor:
Wilhelm Heinrich Uhland
by: J. J. Hoppe
Attorney.

No. 784,450.                                                                    Patented March 7, 1905

UNITED STATES PATENT OFFICE.

WILHELM HEINRICH UHLAND, OF LEIPSIC-GOHLIS, GERMANY.

APPARATUS FOR MAKING STARCH.

SPECIFICATION forming part of Letters Patent No. 784,450, dated March 7, 1905.

Application filed September 9, 1903. Serial No. 172,519.

*To all whom it may concern:*

Be it known that I, WILHELM HEINRICH UHLAND, a subject of the King of Saxony, residing at 13 Lindenstrasse, Leipsic-Gohlis, in the Kingdom of Saxony, German Empire, have invented a new and useful Apparatus for Making Starch, of which the following is a specification.

The object of this invention is to continuously separate starch in a condensed condition from a solution of starch, while at the same time discharging the water freed either wholly or partly from the starch in the manner that the starch solution is vertically conducted in a thin stream downward within the liquid at a continuously-decreasing speed, so that the starch is gradually condensed, while the water is consecutively turned off sidewise at decreasing speeds. The same method and apparatus may also be employed for dividing starch solution into residuum and pure-starch solution.

The apparatus used is illustrated in two different modes of execution in the accompanying drawings, in which—

Figure 7:
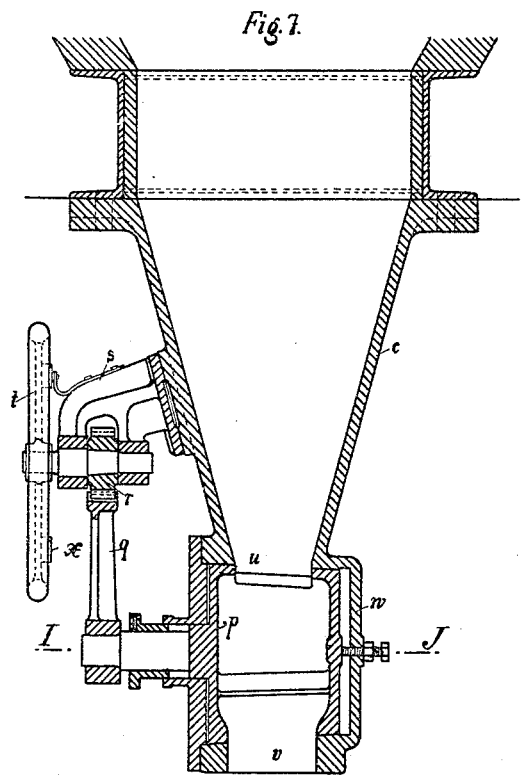
Figure 8:
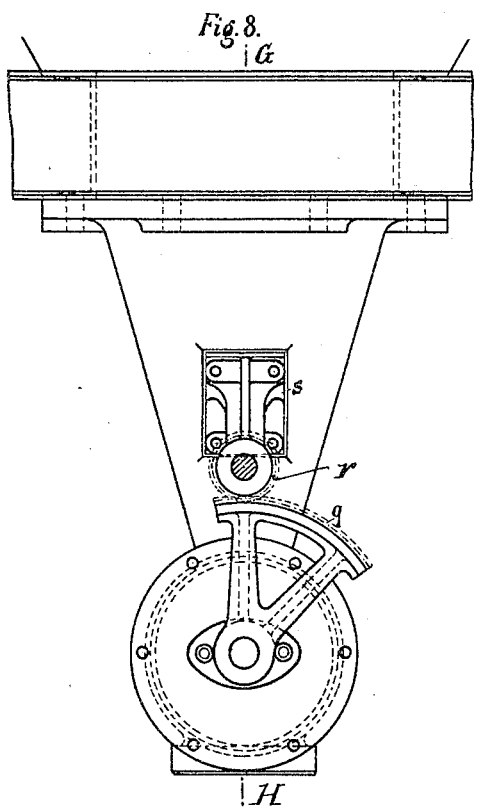
Figure 9:
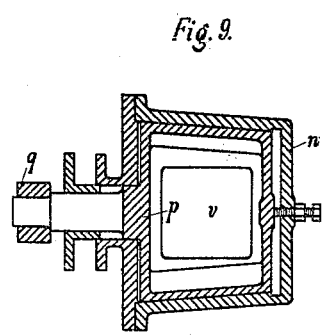
Figure 10:
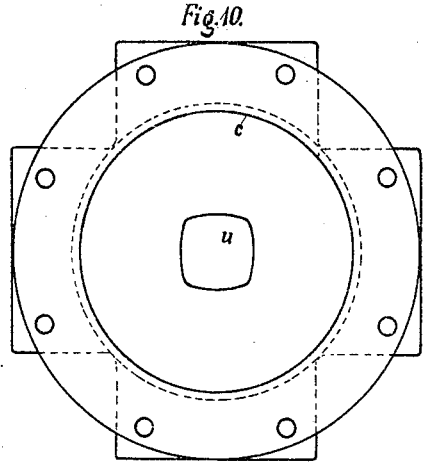

Figure 1 is a vertical central section through a round apparatus made of sheet metal. Fig. 2 is a plan of the same. Fig. 3 is a vertical longitudinal section through a rectangular apparatus made in brickwork on the line A B in Fig. 4. Fig. 4 is a vertical cross-section through the same on the broken line C D in Fig. 3. Fig. 5 is a plan of the same, and Fig. 6 is a horizontal section through the same on the line E F in Fig. 4. Fig. 7 is a vertical section, on an enlarged scale, through the bottom cone and discharge-cock on the line G H in Fig. 8. Fig. 8 is a front view of the same, the cock-spindle being shown in section. Fig. 9 is a horizontal section through the same on the line I J in Fig. 7, and Fig. 10 is a plan of the bottom cone.

Similar letters of reference refer to similar parts throughout the several views.

The apparatus shown at Figs. 1 and 2 is made mostly of sheet metal and comprises a cylindrical upper part $a$ and a conical lower part $b$, to the lower flange of which a bottom cone $c$, with a special discharging device, is fastened. The manner of working this apparatus is best explained on assuming the latter to be completely filled and in the normal state of working. The liquid starch is admitted to the apparatus through an admission-tube $d$, which is preferably disposed at a small distance beneath the level in the apparatus in order to render it at all times full and the flow of the solution from a collecting vessel, if employed, as smooth as possible. This is of special importance for the treatment of the starch solution obtained in the manufacture of potato-starch, since this solution always contains a good deal of dissolved strongly-foaming albumins, and the so objectionable foaming can only be avoided by conducting the liquid starch in as smooth a state as possible, with the exclusion of air. In order to eliminate any air that should nevertheless have been carried along with the liquid and might impair the separating process, the tube $d$ terminates in a widened part $e$ of a tube $f$ in the center of the apparatus, so that the air is allowed to escape upward. The liquid starch thus freed from the air is conducted downward through the vertical tube $f$ and leaves the mouth of this tube at a certain speed, so that the starch particles are given the tendency to retain their direction and describe paths indicated by the dotted lines in Fig 1. If the stream of liquid starch were permitted to flow downward without any disturbance after leaving the tube $f$ and to meet the bottom cone $c$ with a comparatively large speed, the consequence would be that the violent movement necessarily caused by the sudden reverse of the direction would cause the starch particles to be for the most part carried along with the liquid upward, so that a separation of the starch would thereby be rendered impossible. For this reason it is necessary to so arrange the apparatus that the speed of the starch particles moving downward be continuously decreased, so that they may settle softly and without shocks on the lower part of the cone $c$. This gradual decrease of the speed is effected in the manner that the water leaving with the starch particles the lower end of the tube $f$ is turned off to the side, so that the stream of the starch particles is retarded. It is necessary that the turning off of the water should not take place only at the end of the path of the starch particles, as otherwise the reverse of the direction would be too quick, but that the turning off should already commence on the stream leaving the tube $f$. For this purpose two concentric conical partitions $g$ and $h$ are disposed in the apparatus, and they and the upper part $a$ are provided with draining-tubes $i\ k\ l$, placed in the same horizontal plane. Since in the three compartments formed by the two partitions the level of the liquid must necessarily be on the same level, they being open at the lower ends, it follows that in the regular work of the apparatus the liquid will be drained off simultaneously from all the three compartments. Thus the liquid will be consecutively turned off from the stream of starch particles in the directions of the arrows, so that the separation and the simultaneous decrease of the speed of the stream already commence at the mouth of the tube $f$. It is obvious that the starch particles moving downward are inclined to retain their direction, while the water moving sidewise endeavors to take along with it the former, which it is only able to do if its speed exceeds that of the starch particles to a certain extent. This means that the speed of the water may be made larger the larger the velocity of the starch particles is and that on the latter decreasing also the speed of the water moving sidewise must necessarily decrease. In order to attain this object, the draining-tubes $i\ k\ l$ are provided with cocks $m\ n\ o$, respectively, so that it is easy to regulate the draining off of the water by so adjusting the cocks that the quantity of the water flowing off from the central compartment is the greatest and that from the external compartment is the smallest. Evidently the number of the partitions and the output of the apparatus may be increased or decreased.

The apparatus illustrated in Figs. 3 to 6 is made in brickwork; but in principle and working it is substantially the same as the one described before with reference to Figs. 1 and 2. The liquid starch is admitted through the tube $d'$, placed at a distance beneath the level, and the compartment $e'$ is widened upward to allow any air carried along with the liquid to escape. The liquid starch then flows downward along the partition $f'$ and is gradually separated into starch and water by means of the partitions $g\ h$ in the manner described above. When making the apparatus rectangular in section, as shown, it is preferable to provide in its lower part a further partition $h^2$ to enable the starch particles to sink down which may have been taken along with the water between the two partitions $h'$ and $h^2$ and separated above the latter by reason of the increase of the area. The continuous discharge of the condensed starch is effected with the aid of the cock $c$. The latter is specially constructed (see Figs. 7 to 10) in order to be able to discharge from time to time the starch not only in a thick, but also in a nearly solid state, while avoiding all stoppages, even without the help of an agitating device in the bottom part of the cone $c$. The cock-plug $p$, disposed in the casing $w$, forming a part of the cone $c$, is made so large in diameter and provided with so small a square aperture $u$ that about one-eighth of the revolution of the plug is sufficient for opening and closing the cock. The passage $u$ is exactly the same as the mouth of the cone $c$, so that on completely opening the cock the starch will be expelled by the head of the liquid in a comparatively solid condition without encountering any considerable resistance. To further facilitate the exit of the solid starch, the lower aperture $v$ both of the plug and the casing is made larger than the upper aperture $u$, so that the starch stream having once passed the passage $u$ can at once go down without any further friction. The one-eighth revolution of the cock-plug enables the cock to be quickly closed, which is important, seeing that the settled starch is somewhat sharply divided from the liquid above, so that the latter would violently flow out the moment the rest of the more or less solid starch leaves the cock. The complete closing of the cock is effected by a single revolution of the hand-wheel $t$ with the aid of the toothed segment $q$ and the pinion $r$—that is to say, nearly instantaneously. The gearing shown is necessary, since owing to the large diameter of the plug and the thereby-caused comparatively large friction in the casing it would be very difficult to move the plug with a simple lever and the exact adjustment as required for discharging the condensed starch would be rendered difficult. For locking the plug in a certain position a latch-spring $s$ is employed, which engages in the very fine teeth of a crown $x$, secured on the hand-wheel $t$.

For the apparatus shown at Figs. 3 to 6 the draining-tubes, with cocks of the other apparatus according to Figs. 1 and 2, may be replaced by a plurality of holes $i''\ k'\ l'$, which can be partly closed by means of stoppers or the like to regulate the quantities of the liquid drained off.

In the manufacture of rice-starch, where the residuum has a greater specific weight than the liquid starch, the apparatus described so far can also be used for the separation of the residuum from the liquid starch, the former sinking downward and being discharged through the cock $c$ from time to time, while the pure-starch solution flows off through the draining tubes or holes, after which it can be divided into starch and water in the manner described above.

What I claim as my invention, and desire to secure by Letters Patent, is—

1. In an apparatus for separating starch, the combination with a vessel having a downwardly-converging conical bottom part, of a downwardly-converging cone adjoining said conical bottom part of said vessel, a discharge-valve on the lower end of said cone, a vertical tube in the center of said vessel and provided with a widened part projecting above the level, a plurality of downwardly-converging conical partitions concentrically surrounding said vertical tube and projecting above the level and forming a plurality of compartments, a tube connecting at a point beneath the level the widened part of said vertical tube with the source of liquid starch, a plurality of draining-tubes placed in the level and connecting said plurality of compartments with the outside of said vessel, and a plurality of stop-valves on the external ends of said draining-tubes.

2. In an apparatus for separating starch, the combination with a rectangular vessel having a downwardly-converging conical bottom part, of a downwardly-converging cone adjoining said conical bottom part of said vessel, a discharge-valve on the lower end of said cone, a first partition near one side of said vessel projecting above the level and forming a narrow compartment widened upward, a tube connecting at a point beneath the level the widened part of said narrow compartment with the source of liquid starch, a plurality of partitions projecting above the level and forming lateral compartments in said vessel into which the water separated from the starch is allowed to move sidewise, means for draining off the water in the level from said lateral compartments, and means for regulating the quantities of the water drained off.

3. In an apparatus for separating starch, the combination with a vessel having a downwardly-converging conical bottom part, of a downwardly-converging cone adjoining said conical bottom part of said vessel, a vertical tube in the center of said vessel and provided with a widened part projecting above the level, a plurality of downwardly-converging conical partitions concentrically surrounding said vertical tube and projecting above the level and forming a plurality of compartments, a tube connecting at a point beneath the level the widened part of said vertical tube with the source of liquid starch, means for draining off the water separated from said compartments in the level, a cock-casing on the lower end of said cone, a plug in said cock-casing and provided with a passage corresponding to the area of said cone and on the opposite side with a larger passage, the diameter of said plug being so large in proportion to the upper passage, that about one-eighth revolution of the plug is sufficient for opening and closing the cock, a toothed segment, a pinion, a shaft, a hand-wheel, and means for locking said hand-wheel.

In witness whereof I have hereunto set my hand in presence of two witnesses.

WILHELM HEINRICH UHLAND.

Witnesses:
  RUDOLPH FRICKE,
  P. V. C. DUNN.